United States Patent [19]

Tarumi et al.

[11] 4,329,378

[45] May 11, 1982

[54] METHOD FOR MARKING AN INDICATION TO THE LENS

[75] Inventors: Niro Tarumi; Makoto Tsuchiya; Kunio Sasaki, all of Tokyo, Japan

[73] Assignee: Kabushiki Kaisha Hoya Lens (Hoya Lens Corporation), Tokyo, Japan

[21] Appl. No.: 102,348

[22] Filed: Dec. 11, 1979

[51] Int. Cl.³ .............................................. B05D 5/06
[52] U.S. Cl. ...................................... 427/157; 351/51; 351/165; 427/54.1; 427/164; 427/256; 427/384; 427/429
[58] Field of Search ........................ 427/157, 8, 1, 164, 427/256, 429, 384, 54.1; 351/51, 165

[56] References Cited

U.S. PATENT DOCUMENTS

| | | | |
|---|---|---|---|
| 3,700,487 | 10/1972 | Crandon et al. | 427/164 |
| 4,108,827 | 8/1978 | LaLiberte | 260/42.21 |
| 4,139,694 | 2/1979 | LaLiberte | 528/280 |
| 4,186,020 | 1/1980 | Wachtel | 427/157 |

FOREIGN PATENT DOCUMENTS

| | | | |
|---|---|---|---|
| 1400566 | 4/1964 | France . | |
| 2406217 | 5/1979 | France . | |
| 52-42129 | 1/1977 | Japan | 351/51 |
| 569920 | 6/1945 | United Kingdom | 427/157 |
| 1004424 | 9/1965 | United Kingdom . | |

Primary Examiner—Norman Morgenstern
Assistant Examiner—Janyce A. Bell
Attorney, Agent, or Firm—Cushman, Darby & Cushman

[57] ABSTRACT

Plastic eyeglass lenses and the like are marked with an identifying character or symbol by applying to the surface thereof or dissolving or comelting therein a flourescent dyestuff according to the disclosed method. When the proper amount of flourescent dyestuff is included the lens appears normal in sunlight but is characteristically marked in whole or in part under ultraviolet light depending on the area treated.

4 Claims, 3 Drawing Figures

METHOD FOR MARKING AN INDICATION TO THE LENS

BACKGROUND OF THE INVENTION

1. Field of the Invention

This invention relates to a method for marking an indication on plastic lenses for eye-glasses.

2. Description of the Prior Art

The plastic lenses (hereinafter referred to only as lenses) are made of polymethylmethacrylate, polystyrene, polycarbonate, cellulose-acetate, diethylene glycol bis allyl carbonate, referred to hereinafter as CR-39, etc., and those lenses are widely used because of their excellent characteristics, such as light weight, shock resistance, heat resistance and solvent resistance.

In the prior art for marking such lenses, there are methods such as printing an indication on the lenses. However, such methods provide an unacceptable appearance, engraving on the lenses, high cost, the long time required to apply such works, easy peel-off of the printed indication and damage the lenses.

The present inventors have been making efforts to solve such drawbacks and to provide an easy method for marking the indication on such a plastic lens which is noticeable first when exposed to ultraviolet rays.

SUMMARY OF THE INVENTION

This invention provides various methods for providing a marking on a plastic lens characterized in that a whole or part of the lenses is provided with fluorescent dye suitable methods comprise steps of mixing fluorescent dye with the melt of materials for making the lenses, and forming them into lenses and then dying a whole or part part of such lenses with the melt of the dye stuff.

One aspect of this invention is such that the melt of the materials for lenses and the fluorescent dye stuff melt together and are formed in a shape of the desired lenses.

Another aspect of the invention is that the whole or only part of the lenses are dyed and colored with fluorescent dye stuff.

Still a further aspect of this invention is such that the plastic lenses may be conveniently printed with ink which contains the flourescent dye melted in alkohol, etc.

BRIEF DESCRIPTION OF THE ACCOMPANYING DRAWINGS

FIG. 1 is a transmission rate curve of the ultraviolet portion and the visible portion of CR 39 lenses according to the invention and the CR-39 lenses containing no fluorescent dye; and FIGS. 2a and 2b are, respectively, perspective views showing the condition of the lenses printed with indication according to Example 4 under sunlight and the condition when the ultraviolet rays are applied thereon.

DESCRIPTION OF THE PREFERRED EMBODIMENTS

Figure 1:
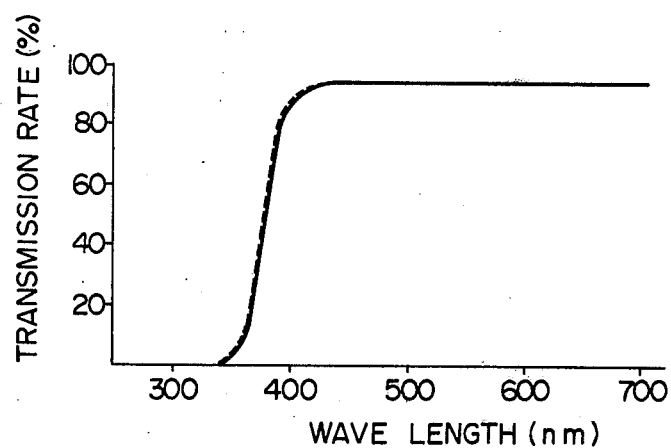

Now, the preferred embodiments according to this invention will be hereinafter discussed with reference to the accompanying drawings.

The first method is characterized in that to the material for the lens or materials therefor is added 0.01%–0.00001 weight % of a fluorescent dye (hereinafter weight %), and preferably 0.001–0.0001% and the dyestuff plus plastic are homogeneously melted together and then formed into a lens according to the conventional method.

Fluorescent dye may be any kind of the type which melts homogeneously with the lens materials. However, if the concentration of the fluorescent dye is above 0.01%, it is not preferable in a lens since it emits sunlight or fluorescent rays inside a room. The lenses treated with the fluorescent dye at less than 0.00001% concentration do not emit fluorescent rays which are seen by the human eye even when the ultraviolet rays are applied thereto and such lenses are accordingly not preferable. According to the density or concentration used in this invention, the lenses are as same as the normal conventional lenses when the sun rays or the room rays strike the lenses but upon application of ultraviolet rays i.e. black light, etc., the lenses emit fluorescent rays which are easily distinguished by the human eyes.

Then, the second method of dying the lenses with the fluorescent dye is characterized in that the fluorescent dye is dissolved or melted in water as seen in the conventional dyeing method for the lenses or dispersed therein, and the lenses are soaked and immersed within the dyeing solution and thereby dyed. However, the lenses do not emit fluorescent rays when exposed to ultraviolet rays, but when the density of the fluorscent dye is within a range of 0.00001%–0.0000% the lenses emit fluorescent rays.

The addition of a surface active agent as the dispersion agent is preferable. Although the solution temperature is appropriate at 60–95° C., we have found that 70° C. is the best for the polymethylmethacrylate and 80° C. for CR-39 lenses, taking into a consideration the evaporation of the solution, operation, and the influence of the lenses. The normal dying time is about 10 seconds to 30 minutes which time is conveniently selected according to the dye density, temperature of the solution and the materials, so as to fulfill the objects of the invention.

There are two ways of dyeing, one being dyeing all the lenses, another being a partial dyeing of indication of only the symbols or letters. In the former the lenses are immersed in the dye solution and finished lenses provide the same effect as when the dye is melted and mixed with the lens materials. The latter lenses are provided with a convenient mask for the symbols or letters which are in turn dyed. This method is convenient when the manufacturers affix the diopter, as in the case of corrective lenses, or manufacturers' numbers for reference.

Furthermore, the method of printing the indication on the lenses provides a same effect as the dying method of the symbol or letters, etc. The prior art printing of the indication employs a printing by a non-aqueous soluble ink, which requires that the ink be projected by a certain thickness and that it is easily solved or melted by an organic solvent. To the contrary, in our invention, the printed indication is not protruded on the lens surface, it is not soluble by the organic solvent and it is semi-perpetually printed and discriminated. Such lenses do not emit the fluorescent rays but emit the fluorscent rays when the ultraviolet rays are applied thereto, such function being the objects of this invention.

The printing method of this invention is explained hereinafter. The fluorescent dye is dissolved in alcohol and the ink is adjusted. A 0.05–10% concentration of the fluorescent dye in this solution is preferable and it is selected so as to be melted completely. An alcohol such as methanol, ethanol, isopropanyl, benzyl alcohol, etc., is usable but among which, the isopropanol is the best in the light of the solvency of the dye and evaporation rate of the solvent, etc. The addition of about 10% glycerine in the alcohol is preferable since it suppresses the evaporation rate of the alcohol. Any material other than alcohol is usable so long as it dissolves the fluorescent dye and it does not affect the lens. The adjusted fluorescent ink as described above is preferably adsorbed onto a rubber stamp which is in turn pressed onto a lens surface. Only such pressing is required to apply the ink onto the lens and the lens is then placed inside a dryer at 60°–90° C., preferably 80° C. for 10 minutes whereby the ink is caused to be transmitted into the lens interior. Thus the printed lens appears to be the same as the convention lens under sunlight but upon application of the ultraviolet rays the symbols or letters thereon can be read. Even when the lens surface is wiped by water or an organic solvent (except, of course, those that dissolve lens per se), the printed symbols or letters are not removed.

Now, the examples according to this invention will be discussed. Unless otherwise indicated all parts and percentages are by weight.

EXAMPLE 1

A material of allyl diglycol carbonate (CR-39) for a plastic eyeglasses lens has added thereto diisoproperoxidicarbonate, Chinubin-P (sold by Ciba-Geigy) as the ultraviolet ray absorption agent and 0.001% fluorescent dye stuff (White flour B sold by sumitomo Chemical Co.) is homogeneously melted and then the lens is formed according to the conventional manner. The thus formed lens is the same as the normal lens under sunlight but upon application of black-light the whole lens emits fluorescent rays, which are visible by human eyes.

The ray transmission rate curve of the ultraviolet portion and the visible portion of the normal lens of CR-39 lens in the same shape as the lens containing no fluorescent rays vs. the lens according to this Example 1 was plotted and there is found no difference by addition of the fluorescent dye.

EXAMPLE 2

Five mg of a fluorescent dye stuff (White flour B or White Flour PCS sold by Sumitomo Chemical Co.) is poured into 1 liter of water and a small amount of Toho salt A-10 as a surfactant (sold by Toho Chemical Co.) is then added. The mixed water is then agitated and kept at 80° C. The lens made of CR-39 is immersed and soaked within said dye solution, washed with water and then wiped for 5 minutes with acetone. The thus treated lens is the same as the normal lens under sunlight but upon exposure to black light, it emits the fluorescent rays which are visible by human eyes.

EXAMPLE 3

A lens made of polymethacrylate is dyed in the same manner as in Example 2 and the same result is obtained. However, acetone is not used.

EXAMPLE 4

Figure 2A:
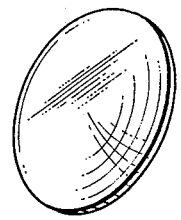
Figure 2B:
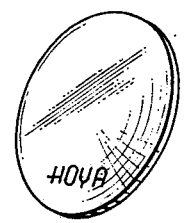

Two hundred mg of a fluorscent dye stuff (White flour B or White flour HCS sold by Sumitomo Chemical Co.) is melted in 200 mg of isopropanol and furthermore, glycerine is added. The solution is mixed homogeneously. This solution is absorbed into a stamp made of porous rubber and said stamp is pressed onto the lens made of CR-39 and the lens is dried in a dryer at 80° C. for 5 minutes. The thus obtained lens is cleaned with acetone and upon receipt of the black-light thereon, the letters printed on the lens as shown in FIG. 2b are visible, however, upon termination of the application of black-light the letters are invisible as shown in FIG. 2a.

The lenses provided with an indication according to the abovementioned methods of this invention provide a means for clearly and easily distinguishing the lenses made by various companies. It also providesfor convenient aftercare of the lenses.

We claim:

1. A method of marking an indication on a plastic eyeglass lens which indication is visible only in ultraviolet light, said process comprising the steps of:
    (1) printing the desired symbol or letter on the plastic lens surface with a fluorescent dyestuff present to the extent of about 0.05 to about 10% by weight, said dye-stuff contained in an organic solvent solution, and thereafter
    (2) drying the thus printed fluorescent dyestuff solution at about 60° to about 90° C. for 1 to 10 minutes thereby causing the fluorescent dyestuff solution to be transmitted into the interior of the pastic lens.

2. The method according to claim 1 wherein the dyestuff is dissolved in an alcohol selected from the group consisting of methanol, ethanol, isopropanol and benzyl alcohol.

3. The method according to claim 1 or claim 2 wherein said solution also contains glycerine up to about 10% by weight.

4. The method according to claim 1 or claim 2 wherein said solution is absorbed in a rubber stamp which prints the letter or symbol on the lens surface.

* * * * *